United States Patent
Huang et al.

(10) Patent No.: US 6,530,628 B1
(45) Date of Patent: Mar. 11, 2003

(54) FRAME STRUCTURE OF COMPUTER HOUSING CAPABLE OF UNLOCKING AND POSITIONING

(75) Inventors: Chen-Liang Huang, Taipei (TW); Chao-Hsuan Yu, Taoyuan (TW)

(73) Assignee: Lite-On Enclosure Inc., Taipei (TW)

( * ) Notice: Subject to any disclaimer, the term of this patent is extended or adjusted under 35 U.S.C. 154(b) by 0 days.

(21) Appl. No.: 09/885,033

(22) Filed: Jun. 21, 2001

(51) Int. Cl.[7] .............................................. A47B 81/00
(52) U.S. Cl. ................................... 312/223.2; 361/683
(58) Field of Search ........................... 312/223.1, 223.2, 312/321.5, 293.3, 293.2; 361/683, 684, 685, 686, 687, 724, 725, 726; 16/268, 266, 271

(56) References Cited

U.S. PATENT DOCUMENTS

| | | | | |
|---|---|---|---|---|
| 5,777,848 A | * | 7/1998 | McAnally et al. ... | 312/223.2 X |
| 5,995,364 A | * | 11/1999 | McAnally et al. ........... | 361/685 |
| 6,000,767 A | * | 12/1999 | Liu et al. ................. | 312/223.2 |
| 6,097,591 A | * | 8/2000 | Ircha .................... | 312/223.2 X |
| 6,111,754 A | * | 8/2000 | Abbott et al. ......... | 312/223.2 X |
| 6,229,696 B1 | * | 5/2001 | Lin et al. ..................... | 361/683 |
| 6,272,009 B1 | * | 8/2001 | Buican et al. ............... | 361/683 |
| 6,313,983 B1 | * | 11/2001 | Liu et al. ..................... | 361/683 |
| 6,341,072 B1 | * | 1/2002 | Liao ..................... | 312/223.2 X |
| 6,349,029 B1 | * | 2/2002 | Leman et al. ............... | 361/683 |
| 6,392,875 B1 | * | 5/2002 | Erickson et al. ............ | 361/683 |
| 6,404,625 B1 | * | 6/2002 | Chen et al. ................. | 361/683 |

FOREIGN PATENT DOCUMENTS

| | | | | |
|---|---|---|---|---|
| EP | 418869 | * | 3/1991 | ................. 361/683 |
| GB | 2137819 | * | 10/1984 | ................. 361/684 |
| GB | 2255674 | * | 11/1992 | ................. 361/683 |

* cited by examiner

*Primary Examiner*—Lanna Mai
*Assistant Examiner*—Hanh V. Tran
(74) *Attorney, Agent, or Firm*—Rosenberg, Klein & Lee (57) ABSTRACT

A frame structure of computer housing capable of unlocking and positioning is provided. The frame structure comprises a mobile seat and a housing frame. One side of the mobile seat forms an embedding part, and the other side thereof has at least one tenon. One side edge of the housing frame has an embedded portion corresponding to the embedding part. The embedded portion can be embedded into the embedding part. The housing frame has at least one through hole corresponding to and penetrated through by the tenon so that the mobile seas can be joggled on the housing frame. Quick assembling/disassembling, positioning and convenience can thus be achieved.

2 Claims, 9 Drawing Sheets

FRAME STRUCTURE OF COMPUTER HOUSING CAPABLE OF UNLOCKING AND POSITIONING

FIELD OF THE INVENTION

The present invention relates to a frame structure of computer housing capable of unlocking and positioning and, more particularly, to a frame structure of computer housing capable of unlocking and positioning, whereby a computer can be easily troubleshot or a motherboard can be easily replaced without the needs of dismantling the computer motherboard and locking with screws.

BACKGROUND OF THE INVENTION

Figure 1:
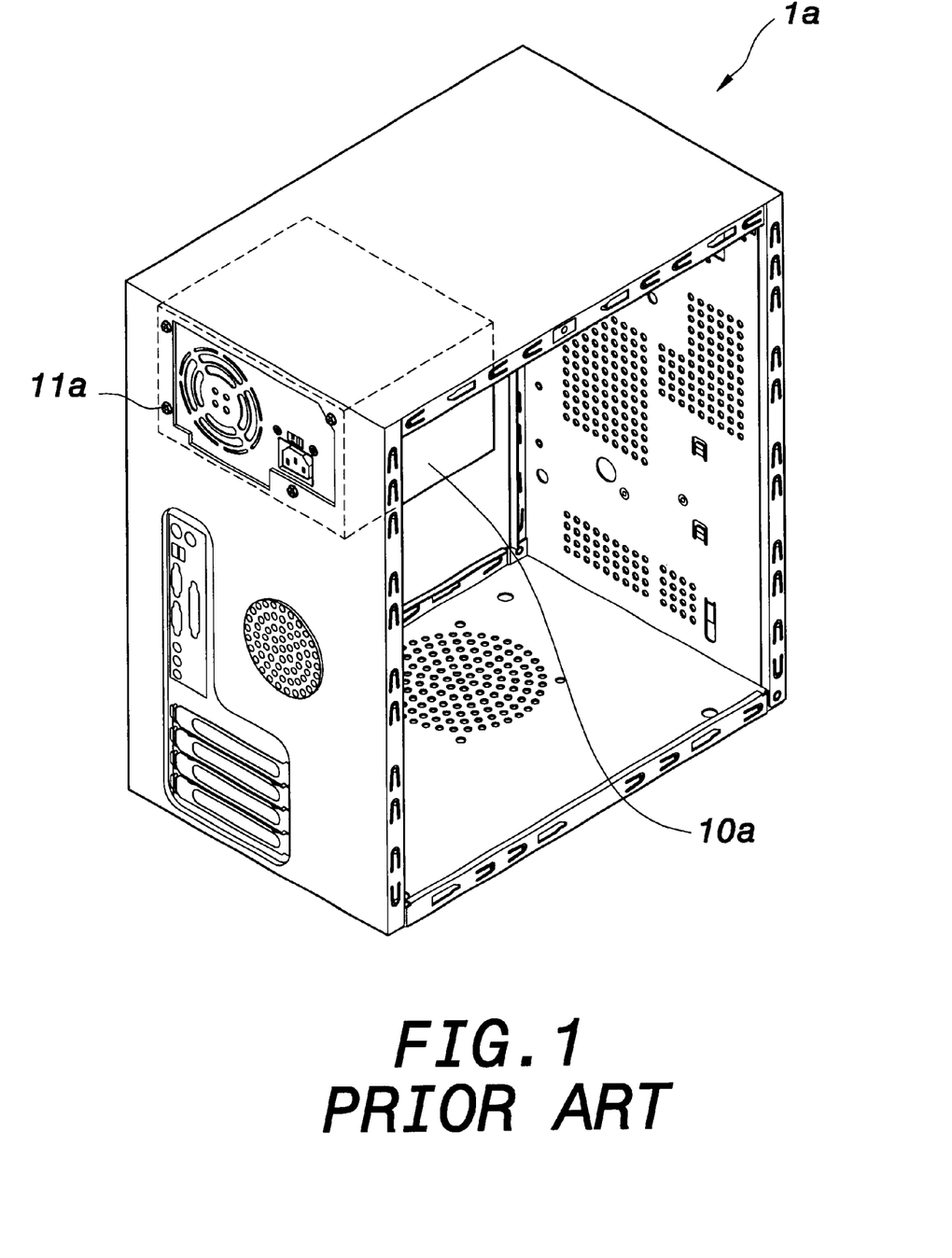
FIG. 1 is a perspective view of a prior art computer housing frame.

As shown in FIG. 1, a power supply 10a or other hardware parts such as floppy disk drives, hard disk drives, or CD-ROM drives are locked on a prior art computer housing frame 1a with screws 11a. When a computer needs to be troubleshot or a motherboard (not shown) needs to be replaced, it is necessary to dismantle the motherboard (not shown) to perform the troubleshooting or replacing operation, resulting in much inconvenience.

A locking structure of computer housing has been disclosed to resolve the above problems. However, it is still necessary to unscrewing screws to perform the troubleshooting or replacing operation, hence also resulting in inconvenience.

Accordingly, the above locking structure of computer housing has inconvenience and drawbacks in practical use. The present invention aims to resolve the problems in the prior art.

SUMMARY OF THE INVENTION

The primary object of the present invention is to provide a frame structure of computer housing, which unlocks a power supply or other hardware parts by means of tenons to facilitate the troubleshooting or replacing operation for a maintenance man. Moreover, quick assembling/disassembling and positioning are achieved by means of embedding.

To achieve the above object, the present invention provides a frame structure of computer housing, which comprises a mobile seat and a housing frame. The mobile seat is used so that a power supply or other hardware parts can be screwed thereto. One side of the mobile seat forms an embedding part, the other side thereof has one or more tenon. A computer part such as a computer motherboard can be disposed in the housing frame. The side edge of the housing frame has an embedded portion, which corresponds to the embedding part and can be embedded into the embedding part. The housing frame has one or more through hole corresponding to and penetrated through by the tenon so that the mobile seat can be joggled on the housing frame. Quick assembling/disassembling and positioning and convenience can thus be achieved.

The various objects and advantages of the present invention will be more readily understood from the following detailed description when read in conjunction with the appended drawing, in which:

DETAILED DESCRIPTION OF THE PREFERRED EMBODIMENTS

Figure 2:
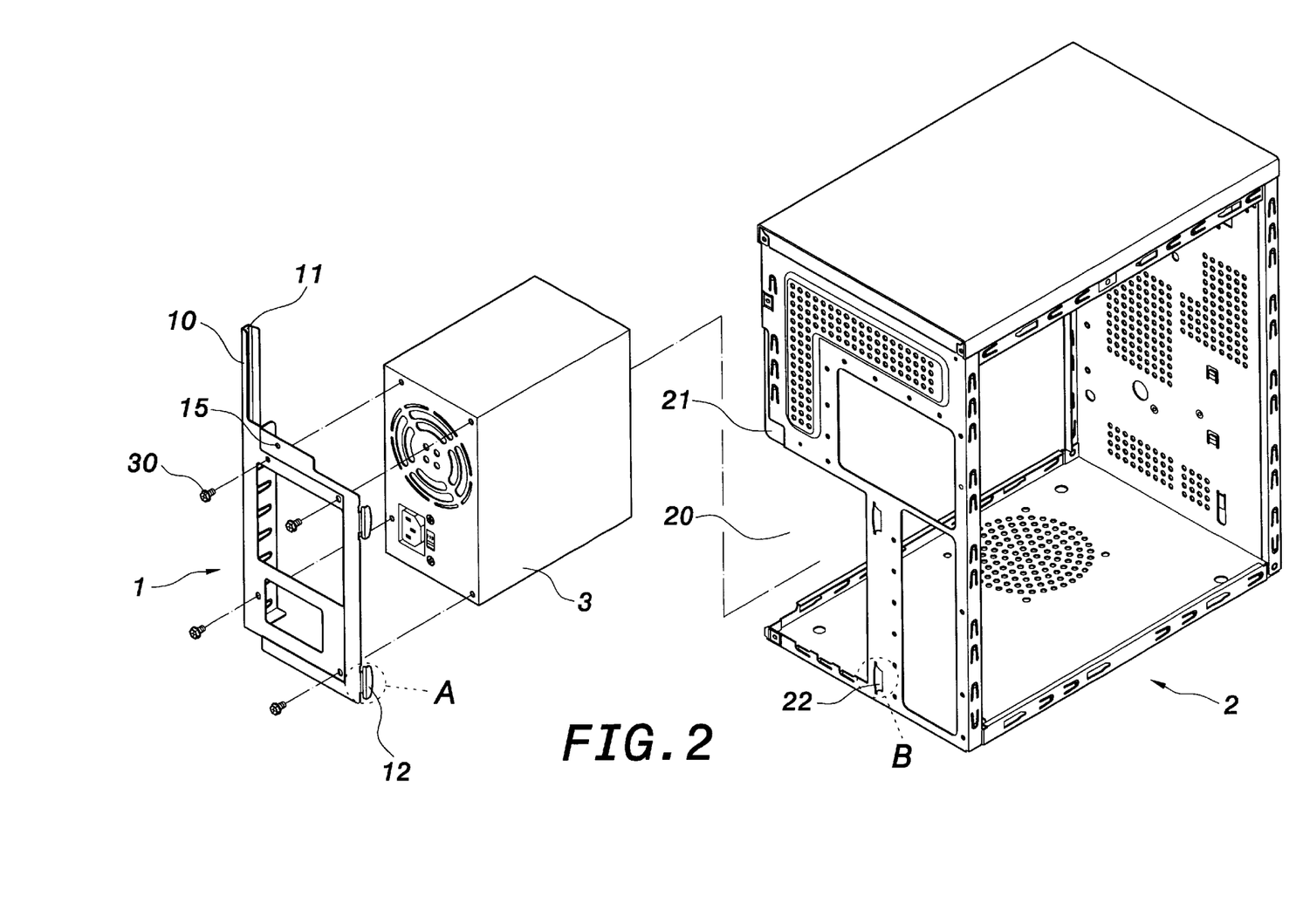
FIG. 2 is an exploded perspective view of the present invention.
Figure 2A:
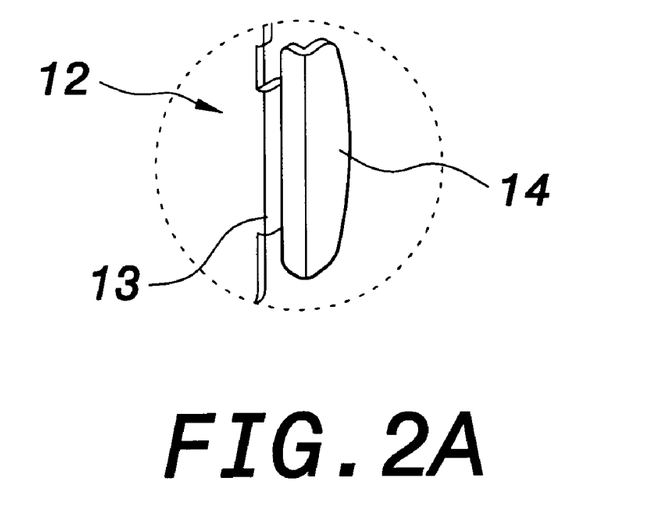
FIG. 2A is a partly enlarged view of the part A shown in FIG. 2.
Figure 3:
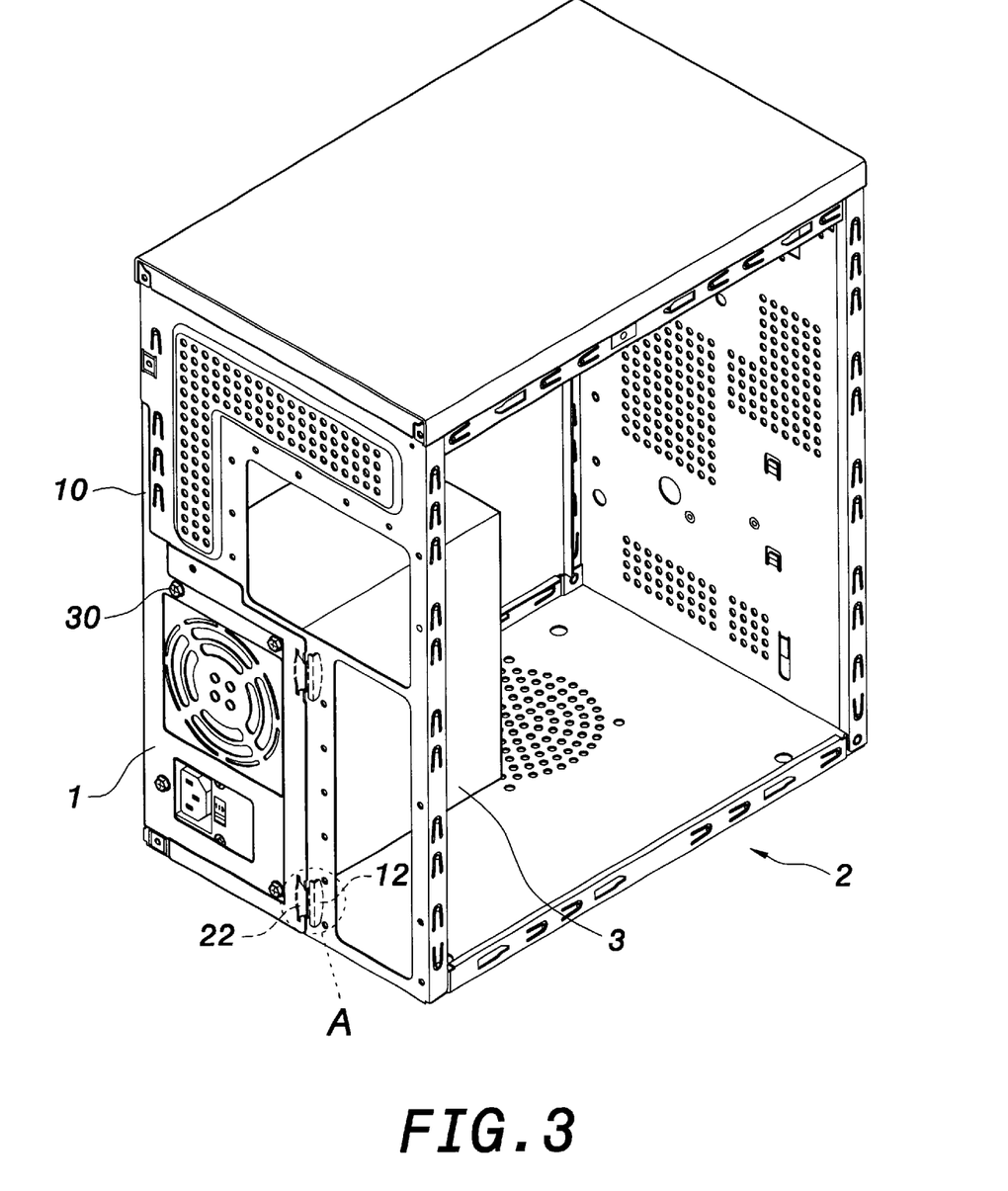
FIG. 3 a perspective view of the present invention.

As shown in FIGS. 2 and 3, the present invention provides a frame structure of computer housing capable of unlocking and positioning. The frame structure of the present invention comprises a mobile seat 1 and a housing frame 2. The mobile seat 1 is a sheet body having a plurality of screw holes 15 to lock a power supply 3 or other hardware parts (not shown) such as floppy disk drives, hard disk drives, or CD-ROM drives with screws 30. One side of the mobile seat 1 is bent inwards to form an embedding part 10 having a groove 11. The other side thereof has one or more tenon 12, which is formed of a narrower connection part 13 and a wider tenon part 14, as shown in FIG. 2A. The connection part 13 is bent inwards to be perpendicular to the mobile seat 1.

Figure 2B:
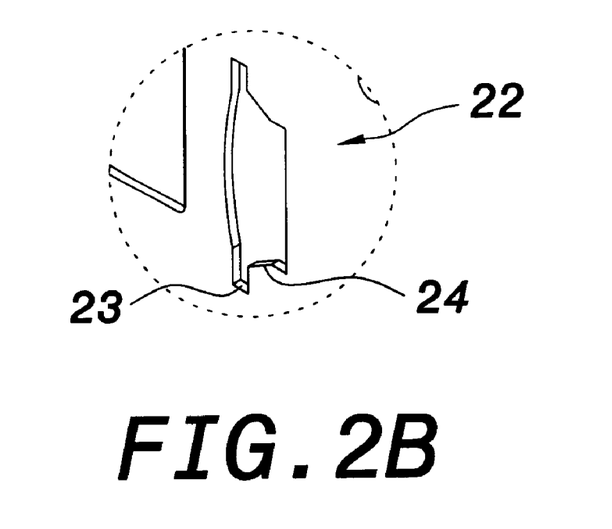
FIG. 2B is a partly enlarged view of the part B shown in FIG. 2.
Figure 3A:
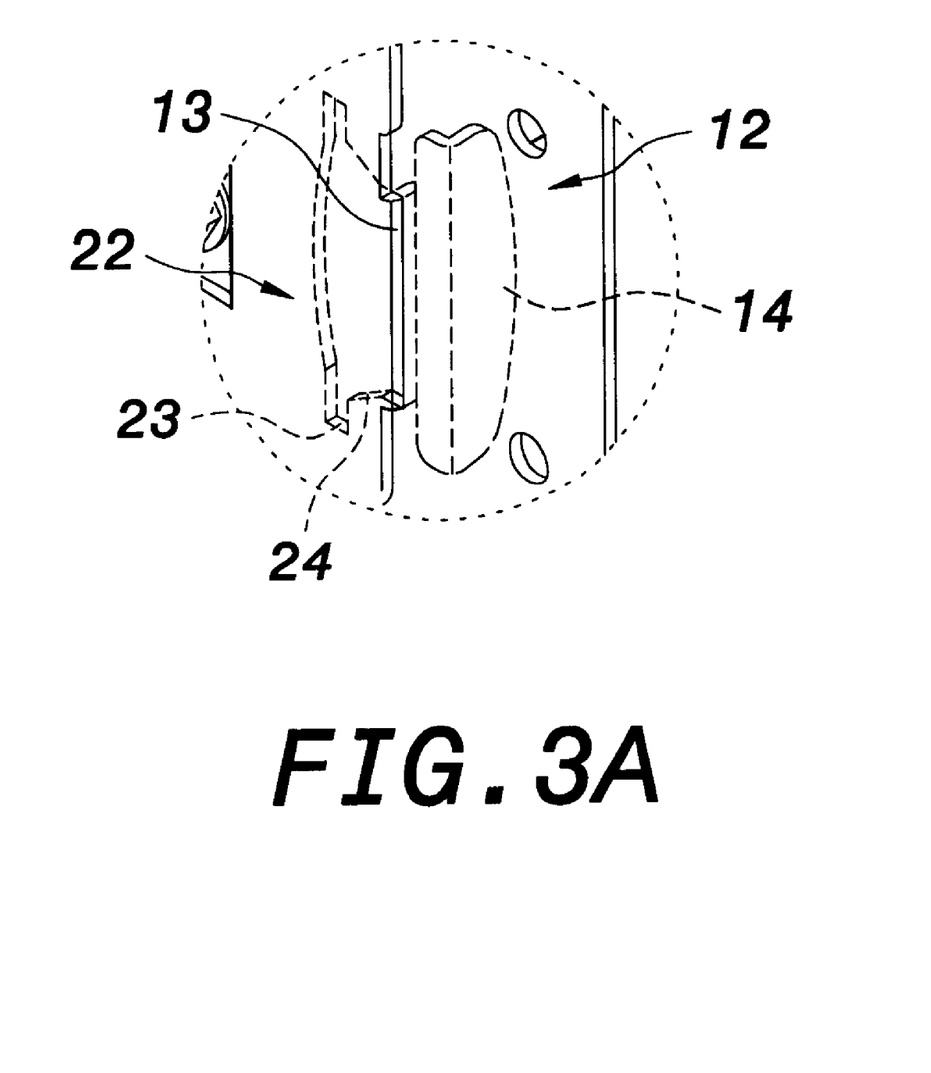
FIG. 3A is a partly enlarged view of the part A shown in FIG. 3.

The housing frame 2 is a hollow frame. A computer part such as a motherboard (not shown) can be disposed in the housing frame 2. The side edge of the housing frame where the power supply 3 is installed forms a gap 20, which matches the mobile seat 1. One side edge of the housing frame 2 has an embedded portion 21 corresponding to the embedding part 10 of the mobile seat 1. The embedded portion 21 can be embedded into the groove 11 of the mobile seat 10 so that the mobile seat 1 and the housing frame 2 can form an assembly. The housing frame 2 has one or more through hole 22 corresponding to the tenon 12 of the mobile seat 1. The through hole 22 is approximately of a 凸-shape formed of a wider penetrated portion 23 and a narrower tenon portion 24, as shown in FIG. 2B. The penetrated portion 23 can be penetrated through by the tenon part 14 of the mobile seat 1. The tenon portion 24 can exactly receive the connection part 12 of the mobile seat 1 so that the tenon 12 of the mobile seat 1 can be joggled on the through hole 22 of the housing frame 2, as shown in FIG. 3A.

Figure 4:
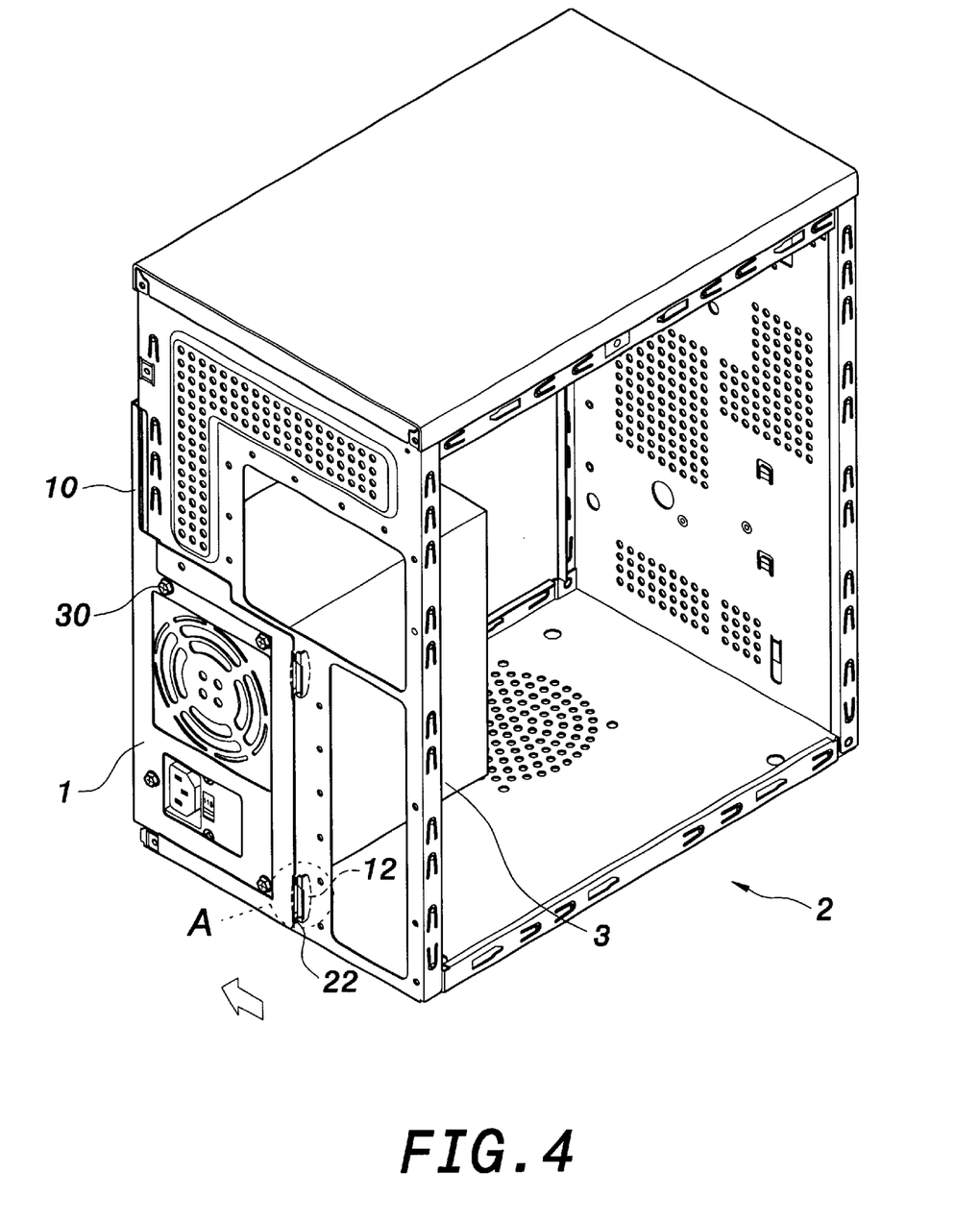
FIG. 4 is a view showing the first dismantling step of the present invention.
Figure 4A:
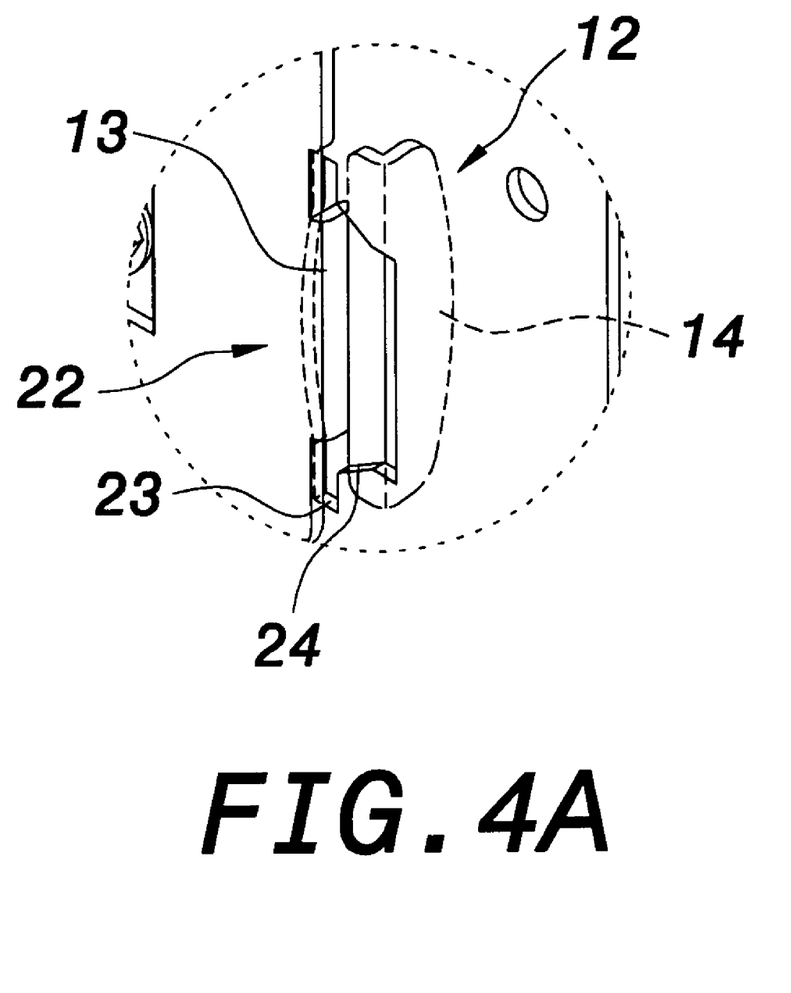
FIG. 4A is a partly enlarged view of the part A shown in FIG. 4.
Figure 5:
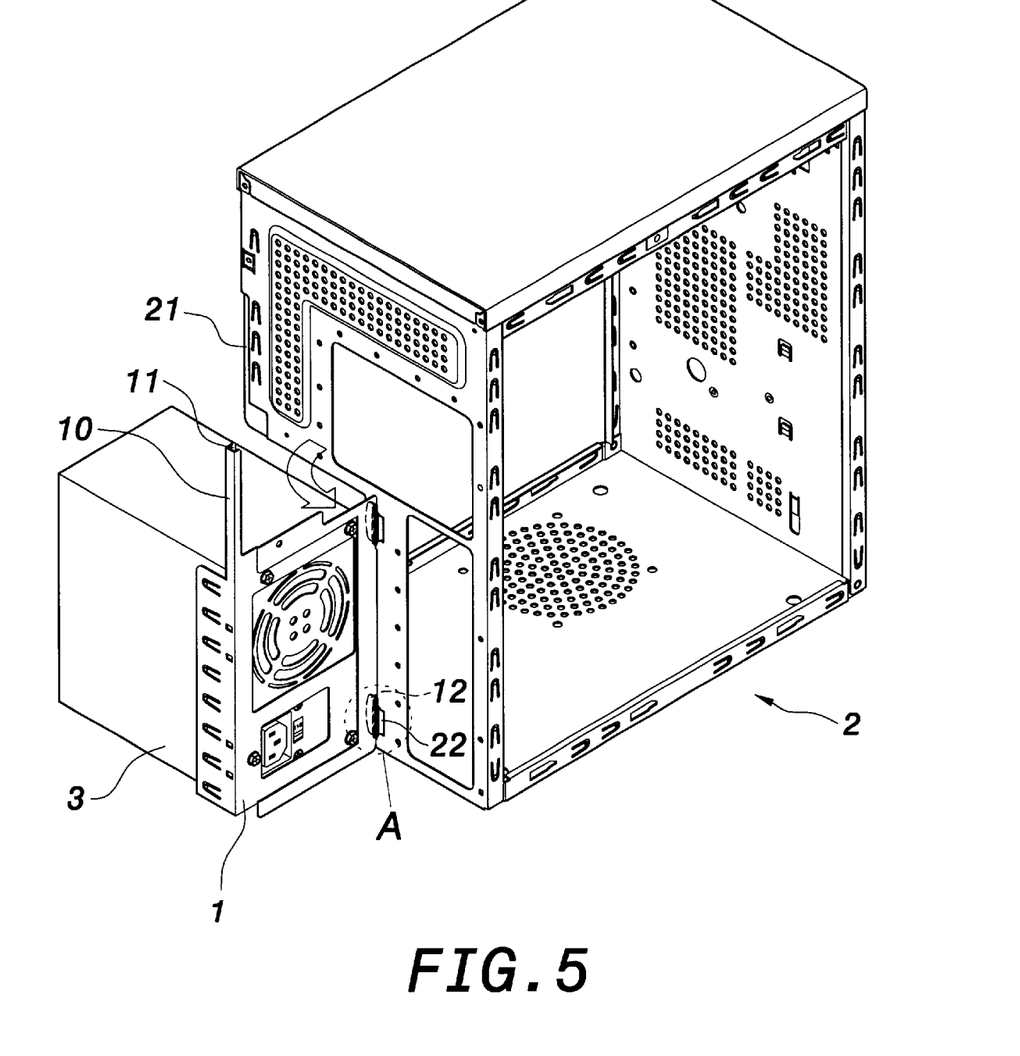
FIG. 5 is a view showing the second dismantling step of the present invention.
Figure 5A:
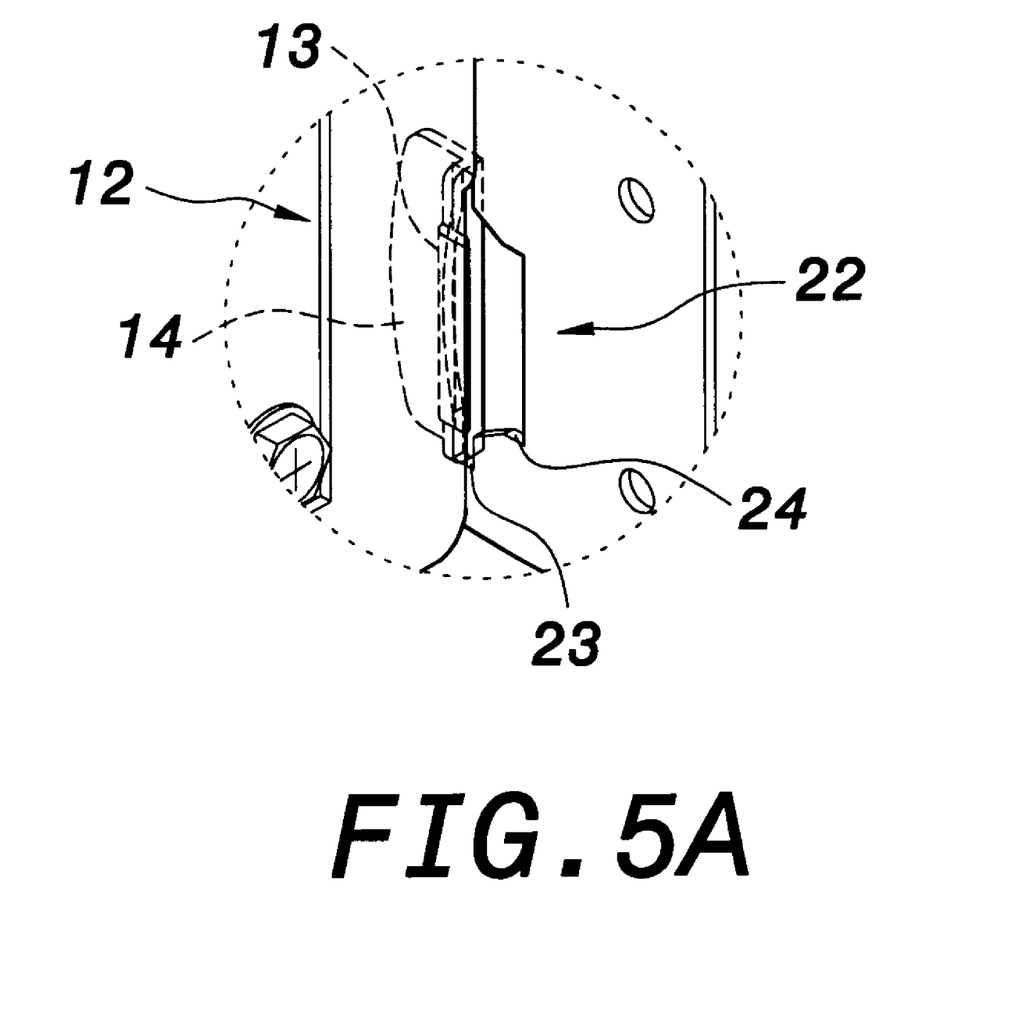
FIG. 5A is a partly enlarged view of the part A shown in FIG. 5.

As shown in FIG. 4, when a computer is to be troubleshot or a hardware part such as a motherboard (not shown) is to be replaced, the mobile seat 1 is first pulled outwards to separate the embedding part 10 from the embedded portion 21. At this time, the connection part 13 of the tenon 12 can leave the tenon portion 24 of the through hole 22, as shown in FIG. 4A. Therefore, the power supply 3 can be unfolded outwards through the mobile seat 1, as shown in FIG. 5, hence facilitating the troubleshooting or replacing operation for a maintenance man. Moreover, because the connection part 13 of the tenon 12 is bent inwards to be perpendicular to the mobile seat 1, as shown in FIG. 5A, the mobile seat 1 will not easily separate from the housing frame 2 when the mobile seat 1 is unlocked. Therefore, inconvenience in assembly will not arise.

Furthermore, the mobile seat 1 can also be used to lock a floppy disk drive, a hard disk drive, or a CD-ROM drive. Therefore, the troubleshooting or replacing operation will not be influenced by the floppy disk drive, the hard disk drive, or the CD-ROM drive.

To sum up, a frame structure of computer housing of the present invention can lock the power supply 3 or other hardware parts such as floppy disk drives, hard disk drives, or CD-ROM drives so that they can be directly unfolded outwards without unscrewing locking parts such as screws, hence facilitating the troubleshooting or replacing operation for a maintenance man. Moreover, when the mobile seat 1 is unfolded outwards, it is not easy to separate the tenon 12 of the mobile seat 1 from the through hole 22 of the housing frame 2. Therefore, trouble in assembly can be avoided.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A frame structure of computer housing capable of unlocking and positioning, comprising:

a rotatable frame member having first and second opposed sides, said first side of said rotatable frame member having an embedding part formed thereon and projecting therefrom, said embedding part having a groove formed therein, said second side of said rotatable frame member having at least one tenon formed thereon, said at least one tenon having a connection part and a tenon part, said tenon part being formed on and projecting from said connection part; and, a housing frame having an opening corresponding to said rotatable frame member and at least one through hole formed therethrough, said housing frame including an embedded portion corresponding to said groove of said embedding part, said at least one through hole corresponding to said at least one tenon of said rotatable frame member and having a penetrated portion and a tenon portion, said at least one tenon being removably received within said through hole, said penetrated portion receiving said tenon part, said connection part being rotatably received in said tenon portion to permit rotation of said rotatable frame member with respect to said housing frame.

2. The frame structure of the computer housing capable of unlocking and positioning as recited in claim 1, wherein said rotatable frame member can be locked with a power supply, a floppy disk drive, a hard drive, or a CD-ROM drive.

* * * * *